Patented Oct. 26, 1943

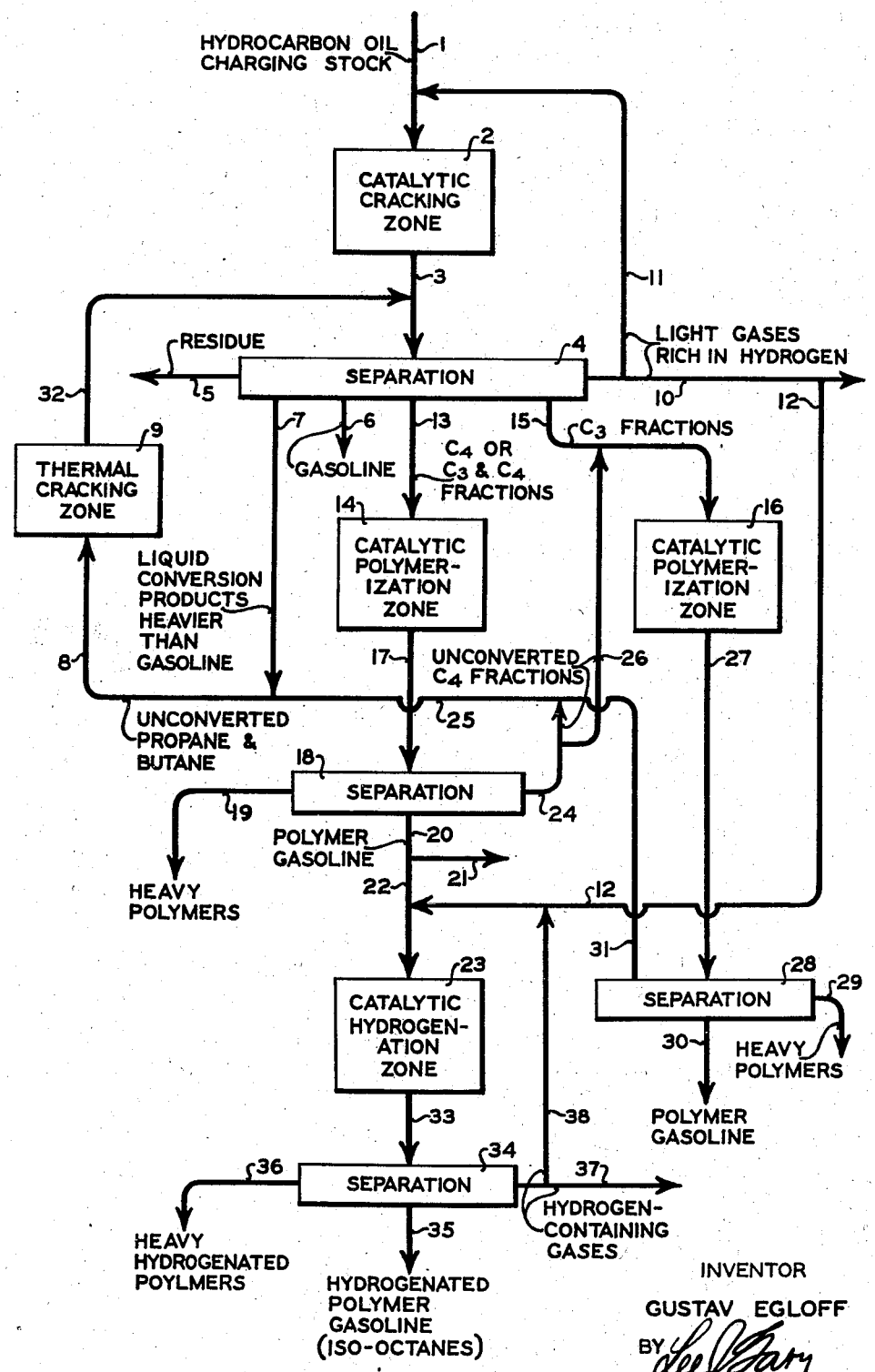

2,332,563

UNITED STATES PATENT OFFICE 2,332,563

CONVERSION OF HYDROCARBONS

Gustav Egloff, Chicago, Ill., assignor to Universal Oil Products Company, Chicago, Ill., a corporation of Delaware Application November 22, 1940, Serial No. 366,679

4 Claims. (Cl. 196—9)

The invention relates to an improved process involving the catalytic cracking of hydrocarbon oil, catalytic polymerization of heavy olefin-containing gases and the thermal cracking treatment of unconverted paraffinic components of the gases subjected to said catalytic polymerization in commingled state with intermediate liquid conversion products of the process, the various steps being combined in an interdependent and cooperative manner which results in the production of high yields of good antiknock gasoline.

In accordance with one specific embodiment of the invention, a hydrocarbon oil suitable for catalytic cracking treatment, to produce therefrom high yields of good antiknock gasoline and gases rich in hydrogen and polymerizable olefinic hydrocarbons, is subjected to such cracking treatment in commingled state with light hydrogen-containing gases produced within the system. The resulting vaporous and gaseous conversion products are fractionated and separated into stabilized gasoline of the desired vapor pressure, heavier liquid conversion products suitable for thermal cracking treatment, relatively light gases rich in hydrogen and heavier normally gaseous fractions rich in polymerizable olefins. Regulated quantities of said hydrogen-containing gases are returned to the catalytic cracking step. The stabilized gasoline is recovered. The heavy gases rich in polymerizable olefins are subjected to catalytic polymerization treatment to convert olefinic components thereof into additional quantities of gasoline fractions of high antiknock value, the latter being separated from unconverted paraffinic components of the gases subjected to said polymerization treatment. Said unconverted paraffins are commingled with said intermediate liquid conversion products, the resulting mixture subjected to vapor-phase thermal cracking treatment to produce additional high yields of good antiknock gasoline and olefinic gases and the resulting products of the thermal cracking step are commingled with the products of the catalytic cracking step prior to said fractionation of the vaporous and gaseous components of the latter.

The composition of the relatively light gases returned to the catalytic cracking step, with respect to the inclusion therein of fractions boiling above hydrogen, may be regulated to suit requirements as may the composition of the heavy gases subjected to polymerization, with respect to the proportion of C3 and C4 fractions included therein Any suitable well known cracking catalyst may be employed for promoting catalytic cracking treatment of the charging oil and this step may, for example, be of the type employing a fixed bed or beds of granular catalyst or of the type wherein finely divided or powdered catalytic material is included in the flowing stream of hydrocarbon oil or vapors undergoing the catalytic cracking treatment.

Any suitable well known polymerizing agent, such as the type now generally known in the art as "solid phosphoric acid," acid treated clays and the like or liquid phosphoric or sulfuric acid may be employed in the polymerizing step of the system and the butylene produced within the system may be subjected to polymerization treatment either alone or in commingled state with the propylene fractions, the conditions of operation being regulated in the polymerizing step to effect polymerization of substantially all of the butylene or to polymerize principally iso-butylene to the substantial exclusion of normal butylene or to effect the mixed polymerization of butylenes and propylene.

The various individual steps of the process are each well known per se and the invention resides in the novel and advantageous manner in which they are cooperatively combined.

The accompanying drawing is essentially a flow diagram illustrating one specific embodiment of the process herein provided and various alternative modes of operation which are also within the scope of the invention.

Referring to the drawing, the hydrocarbon oil charging stock for the process, which may be any oil amenable to catalytic cracking, is supplied through line 1 to the catalytic cracking step 2 wherein it is converted, in contact with any type of catalytic material capable of promoting the desired cracking reaction, under conditions regulated to produce high yields of good antiknock gasoline, substantial quantities of readily polymerizable olefinic gases, lighter hydrocarbon gases and hydrogen, as well as heavier liquid conversion products.

Resulting conversion products are supplied from the catalytic cracking step through line 3 to separation in zone 4 which preferably comprises fractionating, condensing and collecting equipment of any suitable conventional form and which may include conventional equipment for stabilizing the gasoline and absorption equipment for effecting good separation between the desired light and heavy normally gaseous fractions.

Any heavy liquid conversion products unsuitable as charging oil for the subsequent thermal cracking step are removed from the system through line 5. Gasoline of the desired end-boiling point and vapor pressure is removed from the system to storage or to any desired further treatment through line 6. Intermediate liquid conversion products suitable for thermal cracking treatment are supplied through lines 7 and 8 to the thermal cracking step 9, which will be later described. Relatively light hydrocarbon gases and hydrogen are directed from the separating zone through line 10 and may be, all or in part, removed from the system through this line or they may be returned in regulated quantities through line 11 to the catalytic cracking step wherein the presence of hydrogen and light hydrocarbon gases are beneficial and/or regulated quantities of the hydrogen-containing gases may be directed from line 10 through line 12 to the catalytic hydrogenating step 23, when the latter is employed.

Higher boiling normally gaseous products, consisting predominantly of fractions having 3- and 4-carbon atoms in the molecule and which are rich in the readily polymerizable olefins, propylene and butylenes, are directed from separating zone 4 to catalytic polymerization treatment for conversion of the olefins into high yields of liquid polymers boiling within the range of gasoline and of good antiknock value.

It is within the scope of the invention to subject the $C_3$ and $C_4$ gases to polymerization in commingled state or to separate the same and subject the separate fractions to separate polymerization treatment. Two catalytic polymerizing steps 14 and 16 are, therefore, illustrated in the drawing, although only one need be employed when the $C_3$ and $C_4$ gases are subjected to mixed polymerization treatment. In the latter case, the $C_3$ and $C_4$ fractions are directed in commingled state from zone 4 through line 13 to the catalytic polymerization step 14 wherein they are contacted under suitable temperature and pressure conditions with an active cracking catalyst, such as, for example, solid phosphoric acid and wherein they are converted into mixed polymers which result from polymerization of substantially all of the iso and normal butylenes, as well as substantial quantities of the propylene.

When both polymerizing steps are employed, substantially only the $C_4$ fractions are supplied to zone 14, the $C_3$ fractions being separately removed from zone 4 and supplied through line 15 to catalytic polymerizing step 16. In such instances, the catalyst and conditions of operation employed in zone 14 are preferably regulated to effect substantially complete conversion of the iso-butylene fractions supplied thereto with a limited amount or substantially no conversion of the normal butylene fractions. Sulfuric acid is more selective as a polymerizing catalyst to isobutylene than phosphoric acid and with a sulfuric acid catalyst, conditions may be regulated to substantially preclude polymerization of normal butylene. With proper control of the conditions of temperature, pressure and contact time, phosphoric acid may also be used for relatively selective polymerization of the isobutylene, but normally with this catalyst some of the normal butylene will also be converted.

The products of the catalytic polymerization treatment conducted in zone 14 are directed therefrom through line 17 to separating zone 18 which may comprise fractionating equipment of any suitable well known form and may include conventional equipment for stabilizing the polymer gasoline. Heavy polymers, such as those boiling above the range of gasoline, are removed from the separating zone 18 and from the system through line 19. The polymer gasoline is directed from zone 18 through line 20 and may be removed, all or in part, from the system to storage or elsewhere, as desired, through line 21 or, preferably, is directed through line 22 to a catalytic hydrogenating step 23, which will be later described.

The normally gaseous fractions which remain unconverted in polymerizing zone 14 are removed from the separating zone 18 through line 24 and, depending upon the nature of the polymerization treatment in zone 14, may be supplied through lines 25 and 8 to thermal cracking treatment in zone 9, together with the intermediate liquid conversion products from zone 4 or they may be directed from line 24 through lines 26 and 15 to further polymerization treatment in zone 16. When the mixed polymerization of $C_3$ and $C_4$ olefins is accomplished in zone 14, the unconverted gases will consist predominantly of $C_3$ and $C_4$ paraffins and are directed, as previously described, from zone 18 to the thermal cracking step 9. When the selective polymerization of isobutylene is accomplished in zone 14, the unconverted gases will include both butanes and normal butylene and are preferably directed, as previously described, to polymerizing zone 16.

The normally gaseous fractions supplied to zone 16 are therein conducted under suitable temperature and pressure conditions with a polymerizing catalyst capable of converting both the normal butylene and the propylene into high yields of polymer gasoline of good antiknock value. The resulting conversion products are directed from zone 16 through line 27 to separating zone 28 which may comprise fractionating equipment of any suitable well known form and which may, when desired, include equipment for stabilizing the polymer gasoline. Heavy polymers, such as those boiling above the range of the desired polymer gasoline, are removed from zone 28 and from the system through line 29.

The polymer gasoline is directed from zone 28 through line 30 to storage or elsewhere, as desired. Unconverted gases, which consist essentially of propane and butanes, are directed from zone 28 through lines 31, 25 and 8 to thermal cracking treatment in zone 9, together with the intermediate liquid conversion products supplied to this zone, as previously described, from separating zone 4.

The thermal cracking treatment afforded the mixture of intermediate liquid conversion products and essentially paraffinic gases in zone 9 is of a nature regulated to produce additional high yields of good anti-knock gasoline from said intermediate liquid conversion products and effect substantial dehydrogenation of the paraffinic gases to form corresponding olefins and hydrogen. Preferably, substantially vapor-phase cracking conditions are employed in zone 9. The resulting products, in addition to hydrogen, readily polymerizable normally gaseous olefins and gasoline, will include residual liquid, intermediate liquid conversion products and other gases. These products are directed from zone 9 through line 32 to separating zone 4 wherein they are subjected to the same separation as that afforded the conversion products from the catalytic cracking steps with which they are commingled in this zone.

The catalytic hydrogenating step of the system is optional. It is preferably employed, however, when the selective polymerization of isobutylenes is accomplished in zone 14 since, with the high degree of selectivity in this zone, the resulting liquid polymers will consist largely of iso-octenes which may advantageously be hydrogenated to produce iso-octanes of improved antiknock value. Any suitable hydrogenating catalyst, such as nickel oxide, for example, may be employed in zone 23 for effecting hydrogenation of the polymer gasoline and the hydrogen required for this type is preferably derived from the catalytic cracking and dehydrogenating steps of the system, provision being made, as previously described, for supplying hydrogen-containing gases from zone 4 to zone 23.

The hydrogenated polymers are directed from zone 23 through line 33 to separating zone 34 which may comprise fractionating equipment of any suitable well known form. Hydrogenated polymers of the desired boiling range, which consists principally of iso-octanes, are directed from zone 34 through line 35 to storage or elsewhere, as desired. Any heavier products of the hydrogenating steps which would tend to contaminate and increase the antiknock value of the essentially iso-octane product are removed from zone 34 and from the system through line 36. Normally gaseous fractions rich in hydrogen are removed from zone 34 through line 37 and may be discharged, all or in part, from the system through this line but, preferably, regulated quantities of these hydrogen-containing gases are recycled through line 38 to the hydrogenating zone for further use, a substantial excess of hydrogen over that theoretically required for complete hydrogenation of the polymers being maintained in this step.

As an example of one specific operation of the process, the charging stock is a gas oil of approximately 32° A. P. I. gravity derived from mixed base crude, fixed beds of granular catalytic material comprising silica and alumina with a relatively small percentage of circonia are alternately employed for conducting the cracking reaction and reactivated for further use. The average temperature employed in the catalytic reaction zone is approximately 935° F. with a superatmospheric pressure of approximately 30 pounds per square inch as measured at the outlet from the catalyst reactors and with a space velocity, expressed as volume of oil treated, per hour, per unit volume of space occupied by the catalyst bed, of approximately 3.

Separate polymerizing steps are employed, one for converting iso-butylenes and a substantially equal molal proportion of normal butylenes into liquid polymers rich in octenes and the other for converting residual normal butylenes from the first step and propylenes into mixed polymers boiling within the range of gasoline. Both steps employ fixed beds of solid phosphoric acid catalyst, the selective polymerizing operation being conducted at a temperature of approximately 300° F. and a superatmospheric pressure of about 1200 pounds per square inch, while the mixed polymerizing operation is conducted at a temperature of approximately 475° F. and a superatmospheric pressure of about 600 pounds per square inch.

The polymer gasoline formed in the first polymerizing step is catalytically hydrogenated, utilizing gases rich in hydrogen derived from the catalytic and thermal cracking steps in the presence of stationary beds of reduced nickel employed as a catalyst. The hydrogenating step is operated at a superatmospheric pressure of approximately 250 pounds per square inch and at a temperature of 350° F. The resulting hydrogenated polymers, which are rich in iso-octanes, are recovered and the polymer gasoline resulting from the mixed polymerization step is separately recovered.

Unconverted propane and butane from the two polymerizing steps are supplied, together with intermediate liquid conversion products formed in the catalytic and thermal cracking steps, to the thermal cracking zone which is operated at a temperature of approximately 1050° F. and a superatmospheric pressure of about 80 pounds per square inch, superatmospheric, the resulting products being supplied to the same separating zone to which the products of the thermal cracking step are supplied.

In an operation, such as above described, one may obtain per barrel of gas oil charging stock, approximately 58 volume % of cracked gasoline comprising a mixture of that produced in the catalytic cracking step and that produced in the thermal cracking step and having an end-boiling point of approximately 425° F. and an octane number of approximately 75. The mixed polymer gasoline produced may amount to approximately 3.4 gallons per barrel of charging oil supplied to the catalytic cracking step and the hydrogenated polymer product may amount to approximately 2.4 gallons per barrel of gas oil charging stock.

It will, of course, be understood that the invention is not limited to the particular mode of operation described in the foregoing specific example nor to the operating conditions for each of the steps specified therein, since several alternative modes of operation have been illustrated and described and it is within the knowledge of one skilled in the art to determine optimum operating conditions in each of the various steps, which conditions will vary with the specific mode of operation employed, as well as the nature of the charging stock, catalysts and the desired nature of the products.

I claim as my invention:

1. The process of converting hydrocarbons to produce therefrom high yields of good antiknock gasoline, which comprises cracking a straight-run hydrocarbon oil in the presence of a siliceous cracking catalyst, separating from the resulting vaporous and gaseous products gasoline of the desired end-boiling point and vapor pressure, higher boiling liquid fractions suitable for thermal cracking treatment, high-boiling normally gaseous fractions rich in readily polymerizable olefins and lower boiling gases rich in hydrogen, returning regulated quantities of the latter to the catalytic cracking step, recovering said gasoline, subjecting said high-boiling normally gaseous fractions to polymerization to convert olefinic components thereof into substantial yields of liquid polymers boiling within the range of gasoline and of good antiknock value, commingling unconverted paraffinic components of the high-boiling gases subjected to said polymerization with said higher boiling liquid fractions, thermally cracking the mixture in essentially vaporous state under conditions regulated to produce therefrom substantial additional yields of good antiknock gasoline and readily polymerizable olefinic gases and commingling resulting vaporous and gaseous products of the thermal cracking step with the products of the catalytic cracking step prior to said separation of the vaporous and gaseous components of the latter.

2. The process of converting hydrocarbons which comprises, catalytically cracking a virgin hydrocarbon oil charging stock to produce therefrom high yields of good antiknock gasoline, higher boiling liquid fractions and normally gaseous fractions rich in readily polymerizable olefins and hydrogen, separating from resulting vaporous and gaseous conversion products gasoline of the desired end-boiling point and vapor pressure, higher boiling normally liquid fractions, normally gaseous fractions consisting predominantly of butanes and butylenes, normally gaseous fractions consisting predominantly of propane and propylene and a lower boiling gaseous fraction rich in hydrogen, returning the latter in regulated quantities to the catalytic cracking step, recovering said gasoline, catalytically polymerizing olefinic components of said butane-butylene fractions to produce therefrom substantial yields of liquid polymers boiling within the range of gasoline and of good antiknock value, separately subjecting said propane-propylene fractions to catalytic polymerization treatment to produce therefrom substantial yields of liquid polymers boiling within the range of gasoline of good antiknock value, separately recovering the polymer gasolines produced in the separate polymerizing steps, commingled unconverted propane and unconverted butanes from the polymerizing steps with said higher boiling liquid fractions, thermally cracking the resulting mixture in essentially vaporous state to produce therefrom additional high yields of good antiknock gasoline and additional quantities of propylene and butylenes and commingling resulting vaporous and gaseous products of the thermal cracking step with the products of the catalytic cracking step prior to said separation of the vaporous and gaseous components of the latter.

3. The process of converting hydrocarbons which comprises, catalytically cracking a virgin hydrocarbon oil charging stock to produce therefrom high yields of good antiknock gasoline, higher boiling liquid fractions and normally gaseous fractions rich in readily polymerizable olefins and hydrogen, separating from resulting vaporous and gaseous conversion products gasoline of the desired end-boiling point and vapor pressure, higher boiling normally liquid fractions, normally gaseous fractions consisting predominantly of butanes and butylenes, normally gaseous fractions consisting predominantly of propane and propylene and a lower boiling gaseous fraction rich in hydrogen, returning the latter in regulated quantities to the catalytic cracking step, recovering said gasoline, subjecting said butane-butylene fractions to catalytic polymerization treatment to convert principally their iso-butylene components into liquid polymers consisting principally of iso-octenes, catalytically hydrogenating the latter to produce iso-octanes and recovering the same, commingling unconverted butanes and normal butenes from said polymerizing step with said propane-propylene fractions, subjecting the mixture to catalytic polymerization treatment to convert a major portion of its olefinic components into liquid polymers of high antiknock value boiling within the range of gasoline, recovering the latter, commingling unconverted propane and butanes from the second mentioned polymerizing step with said higher boiling liquid fractions, thermally cracking the mixture in essentially vaporous state to produce therefrom substantial additional yields of good antiknock gasoline and additional quantities of propylene and butylenes and commingling resulting vaporous and gaseous products of the thermal cracking step with the products of the catalytic cracking step prior to said separation of the vaporous and gaseous components of the latter.

4. The process of converting hydrocarbons which comprises, catalytically cracking a virgin hydrocarbon oil charging stock to produce therefrom high yields of good antiknock gasoline, higher boiling liquid fractions and normally gaseous fractions rich in readily polymerizable olefins and hydrogen, separating from resulting vaporous and gaseous conversion products gasoline of the desired end-boiling point and vapor pressure, higher boiling normally liquid fractions, normally gaseous fractions consisting predominantly of propylene-butylenes and the corresponding parafins and a lower boiling gaseous fraction rich in hydrogen, returning the latter in regulated quantities to the catalytic cracking step, recovering said gasoline, subjecting the first named normally gaseous fractions to catalytic polymerization treatments to effect the mixed polymerization of propylene and butylenes into substantial yields of liquid polymers of good antiknock value boiling within the range of gasoline, recovering the latter, commingling unconverted paraffinic gases from the polymerizing step with said higher boiling liquid fractions, subjecting the mixture to thermal cracking treatment in essentially vaporous state to produce therefrom additional high yields of good antiknock gasoline and substantial additional quantities of propylene and butylenes and commingling resulting products of thermal cracking step with the products of the catalytic cracking step prior to said separation of the vaporous and gaseous components of the latter.

GUSTAV EGLOFF.